(12) United States Patent
Forthoffer et al.

(10) Patent No.: US 12,306,294 B2
(45) Date of Patent: May 20, 2025

(54) TRAILER TANDEM POSITION SENSOR

(71) Applicant: R.A. PHILLIPS INDUSTRIES, INC., Santa Fe Springs, CA (US)

(72) Inventors: Daniel William Forthoffer, Birmingham, MI (US); John Patrick Cavanagh, Windermere, FL (US)

(73) Assignee: R.A. PHILLIPS INDUSTRIES, INC., Irvine, CA (US)

( * ) Notice: Subject to any disclaimer, the term of this patent is extended or adjusted under 35 U.S.C. 154(b) by 448 days.

(21) Appl. No.: 17/963,799

(22) Filed: Oct. 11, 2022

(65) Prior Publication Data

US 2023/0113053 A1   Apr. 13, 2023

Related U.S. Application Data (60) Provisional application No. 63/254,945, filed on Oct. 12, 2021.

(51) Int. Cl.
*G01S 13/931* (2020.01)

(52) U.S. Cl.
CPC ..... *G01S 13/931* (2013.01); *G01S 2013/9315* (2020.01); *G01S 2013/93272* (2020.01)

(58) Field of Classification Search
CPC ............. G01S 13/931; G01S 15/931; G01S 2013/9315; G01S 17/931; G01S 2013/93272; G01S 7/003; G01S 7/4813; G01S 15/872; G01S 17/08
See application file for complete search history.

(56) References Cited

U.S. PATENT DOCUMENTS

| | | | | |
|---|---|---|---|---|
| 5,314,201 A * | 5/1994 | Wessels | ............... | B62D 53/068 180/209 |
| 5,326,144 A * | 7/1994 | Forcier | ................ | B62D 53/068 248/316.1 |
| 5,678,834 A * | 10/1997 | Wise | .................... | B62D 53/068 180/209 |
| 5,905,433 A * | 5/1999 | Wortham | ............... | G07C 5/008 340/3.4 |
| 6,127,939 A * | 10/2000 | Lesesky | ................ | B60T 8/1708 307/10.1 |
| 7,243,885 B2 * | 7/2007 | Zeiher | .................... | G01S 13/931 248/188.2 |
| 7,535,346 B2 * | 5/2009 | Kalous | ................... | B60Q 1/305 340/425.5 |
| 7,932,815 B2 * | 4/2011 | Martinez | .................. | B60D 1/62 340/539.23 |
| 8,473,173 B1 * | 6/2013 | Robles | ................... | G08G 1/166 340/904 |
| 8,534,688 B1 * | 9/2013 | Dunn | ................... | B62D 53/068 280/149.2 |

(Continued)

*Primary Examiner* — Peter M Bythrow
(74) *Attorney, Agent, or Firm* — WOMBLE BOND DICKINSON (US) LLP (57) ABSTRACT

A tandem position sensing system includes a range sensor configured to emit a signal toward a sliding tandem and to measure a distance between the range sensor and the sliding tandem, a sensor housing configured to house the range sensor, the sensor housing having a first opening through which the range sensor is configured to emit the signal, and a coupling member attached to the sensor housing and configured to couple the range sensor housing to a body of a trailer or a chassis.

16 Claims, 6 Drawing Sheets

(56) References Cited

U.S. PATENT DOCUMENTS

| | | | | |
|---|---|---|---|---|
| 9,020,730 B2* | 4/2015 | Agnew | | B60T 17/18 |
| | | | | 340/433 |
| 10,007,262 B1* | 6/2018 | Schwindt | | G07C 5/008 |
| 10,168,708 B2* | 1/2019 | Cohen | | G01S 13/765 |
| 10,841,127 B1* | 11/2020 | Greer | | H04W 4/44 |
| 11,034,200 B2* | 6/2021 | Genheimer | | B60D 1/015 |
| 11,113,584 B2* | 9/2021 | Deng | | G01S 17/86 |
| 11,163,312 B2* | 11/2021 | Gist, IV | | G05D 1/027 |
| 11,173,883 B2* | 11/2021 | Nemeth | | B60T 7/22 |
| 11,363,438 B2* | 6/2022 | Lotz | | B62D 35/001 |
| 11,580,484 B2* | 2/2023 | Patnaik | | G06Q 10/083 |
| 2004/0032323 A1* | 2/2004 | Nommensen | | G01G 19/12 |
| | | | | 340/440 |
| 2004/0239574 A1* | 12/2004 | Zeiher | | G01S 7/02 |
| | | | | 343/757 |
| 2005/0104322 A1* | 5/2005 | Swannie | | G01S 15/931 |
| | | | | 280/432 |
| 2009/0005932 A1* | 1/2009 | Lee | | G01S 13/862 |
| | | | | 701/41 |
| 2009/0219147 A1* | 9/2009 | Bradley | | G01S 15/931 |
| | | | | 340/431 |
| 2010/0013188 A1* | 1/2010 | Ortmann | | B60D 1/36 |
| | | | | 280/477 |
| 2012/0191285 A1* | 7/2012 | Woolf | | B60D 1/62 |
| | | | | 701/25 |
| 2016/0153778 A1* | 6/2016 | Singh | | G06T 7/60 |
| | | | | 702/167 |
| 2016/0362135 A1* | 12/2016 | Xu | | B62D 13/06 |
| 2017/0363728 A1* | 12/2017 | Prasad | | G01S 13/878 |
| 2018/0068566 A1* | 3/2018 | Prasad | | G08G 1/167 |
| 2019/0179010 A1* | 6/2019 | Nasser | | B60D 1/62 |
| 2021/0129906 A1* | 5/2021 | Oh | | B62D 15/025 |
| 2021/0139090 A1* | 5/2021 | Shalit | | B62D 53/0871 |
| 2021/0181737 A1* | 6/2021 | Patnaik | | B60W 60/0015 |
| 2021/0341583 A1* | 11/2021 | Adams | | B60R 16/02 |
| 2021/0405185 A1* | 12/2021 | Price | | G01S 13/931 |
| 2022/0136823 A1* | 5/2022 | Joshi | | G01S 17/08 |
| | | | | 701/300 |
| 2022/0153212 A1* | 5/2022 | Salter | | G01S 7/4008 |
| 2023/0061950 A1* | 3/2023 | Jeong | | G01S 17/32 |
| 2024/0255636 A1* | 8/2024 | Kolasinski | | G01S 13/87 |

* cited by examiner

TRAILER TANDEM POSITION SENSOR

CROSS-REFERENCE TO RELATED APPLICATION(S)

This application claims priority to, and the benefit of, U.S. Provisional Application No. 63/254,945 ("TRAILER TANDEM POSITION SENSOR"), filed on Oct. 12, 2021, the entire content of which is incorporated herein by reference.

FIELD

The present disclosure relates to truck-trailer systems and methods of using the same.

BACKGROUND

Most semi-tractor trailers in the US have sliding tandems, which are a set of 8 wheels on two axles that are moveably coupled to the rear underside of the trailer. The tandems can slide along a track under the trailer to allow for the distribution of weight of the trailer to be adjusted to support better ride control, handling, and turning radius. Some states (e.g., Michigan and California) have laws pertaining to the minimum and maximum lengths that the tandem can be adjusted to in order to alleviate concerns with semi ride control and/or road weight distribution. It is currently the responsibility of the driver to confirm that the tandem is positioned to a length that is allowed under the laws pertaining to the state in which the semi will be transiting. Violating these laws can result in Federal Motor Carrier Safety Administration (FMCSA) violations, fines, and/or other driver infractions.

Furthermore, the position of the tandem is a significant factor in the turning radius of the overall vehicle when connected to the semi-trailer. For example, a tandem set all the way to the rear of the trailer may have a significantly greater turning radius than a tandem that is set closer to the front of the trailer. As such, when entering inner cities, some drivers may adjust the tandem to provide better turning radius to avoid hitting curbs on turns in tight areas. In the related art, tandem position observations are performed manually/visually by the driver.

The above information disclosed in this Background section is only for enhancement of understanding of the background of the invention and therefore it may contain information that does not form the prior art that is already known to a person of ordinary skill in the art.

SUMMARY

Aspects of embodiments of the present disclosure are directed to a tandem position sensing system mounted to the underside of a trailer or chassis, which is configured to measure the distance of the sliding tandem to a fixed position (e.g., the kingpin) under the trailer. According to some embodiments, the tandem position sensing system is capable of communicating distance/position data to a dispatcher/fleet manager and/or a driver of the truck coupled to the trailer.

According to some embodiments of the present disclosure, there is provided a tandem position sensing system including: a range sensor configured to emit a signal toward a sliding tandem and to measure a distance between the range sensor and the sliding tandem; a sensor housing configured to house the range sensor, the sensor housing having a first opening through which the range sensor is configured to emit the signal; and a coupling member attached to the sensor housing and configured to couple the range sensor housing to a body of a trailer or a chassis.

In some embodiments, the range sensor includes a time-of-flight (ToF) sensor, and the signal includes a light signal or a sound wave.

In some embodiments, the range sensor includes: an emitter configured to emit the signal toward the sliding tandem; a receiver configured to receive a reflected signal from the sliding tandem; and a processing circuit configured to calculate the distance between the range sensor and the sliding tandem based on an emission time of the signal and a receive time of the reflected signal.

In some embodiments, the range sensor further includes: a communication circuit in electrical communication with a telematics gateway circuit at the trailer or the chassis and is configured to transmit data generated by the processing circuit to the telematics gateway circuit over a controller area network (CAN) bus of the trailer or the chassis, an RS232/485 connection, a power line communication (PLC) connection, or a wireless communication link.

In some embodiments, the range sensor includes: an internal battery configured to provide electrical power to the range sensor.

In some embodiments, the range sensor is coupled to an electrical system of the trailer or the chassis and receives electrical power from at least one of an electrical circuit of an anti-lock braking system (ABS) of the trailer or the chassis, a light circuit providing power to lights of the trailer or the chassis, and a power-over-ethernet (PoE) connection.

In some embodiments, the range sensor is configured to periodically transmit data based on the distance between the range sensor and the sliding tandem, and the data includes at least one of: the distance between the range sensor and the sliding tandem, a distance between a kingpin of the trailer or the chassis and the sliding tandem, a distance between a nose of the trailer or the chassis and the sliding tandem, and an alert indicating an unlocked state of the sliding tandem while in transit.

In some embodiments, the sliding tandem includes a sliding trailer tandem or a sliding chassis tandem, and the sliding tandem has an adjustable position along a length of the trailer or the chassis.

In some embodiments, the sensor housing includes: a main body configured to house the range sensor and fixedly coupled to the coupling member; and a barrel extending away from the main body generally along a signal path of the range sensor.

In some embodiments, the sensor housing includes glass-filled nylon material.

In some embodiments, the coupling member includes a first fastener and a second fastener attached to a top of the sensor housing and facing one another, the first and second fasteners being configured to grip a flange of an I-beam at a bottom side of the trailer or the chassis.

In some embodiments, the first fastener includes: a first U-shaped clip having two parallel arms that extend along and overlap a flange of an I-beam, one of the two parallel arms having a threaded through hole to enable a bolt to screw through and apply compressive force against the flange of the I-beam and to fasten the first U-shaped clip to the I-beam; and a first stem extending from an other one of the two parallel arms and configured to be fastened to the sensor housing.

In some embodiments, the coupling member further includes: a U-shaped mounting bracket coupled to the first and second fasteners and configured to be mounted to two sides of the sensor housing, and wherein the U-shaped mounting bracket is configured to be bolted to the sensor housing through a plurality of threaded through holes on the sides of the sensor housing.

In some embodiments, the tandem position sensing system further includes: a reflector configured to be mounted to the sliding tandem and to reflect the signal back to the range sensor.

In some embodiments, the reflector includes: a mounting bracket configured to attach to a surface of the sliding tandem; a reflective portion having a reflective surface configured to reflect the signal back to the range sensor; and a bendable arm coupled to the mounting bracket and the reflective portion and configured to bend at a joint to adjust a relative angle of the mounting bracket and the reflective portion.

In some embodiments, the reflector includes glass-filled nylon material.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure but are intended to be illustrative only.

DETAILED DESCRIPTION

The detailed description set forth below in connection with the appended drawings is intended as a description of illustrative embodiments of a trailer system including a tandem position sensor in accordance with the present disclosure, and is not intended to represent the only forms in which the present disclosure may be implemented or utilized. The description sets forth the features of the present disclosure in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like elements or features.

Aspects of embodiments of the present disclosure are directed to a tandem position sensing system mounted to the undercarriage of a trailer or chassis, which is capable of measuring the position of the trailer/chassis sliding tandem and reporting this information to the driver of the vehicle and/or to a dispatch/external server.

Figure 1:
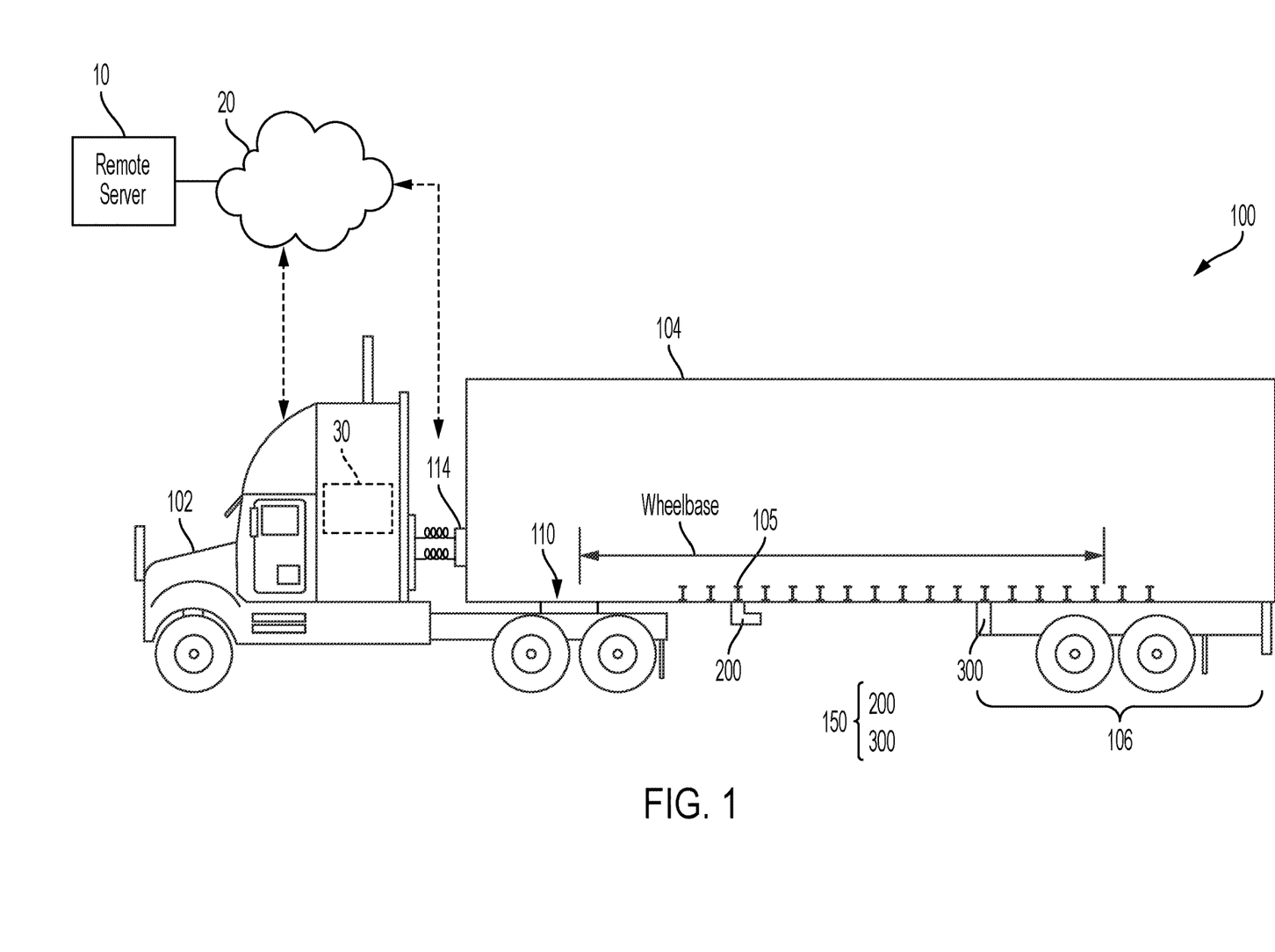
FIG. 1 illustrates a vehicle utilizing the tandem position sensing system, according to some embodiments of the present disclosure.
Figure 2:
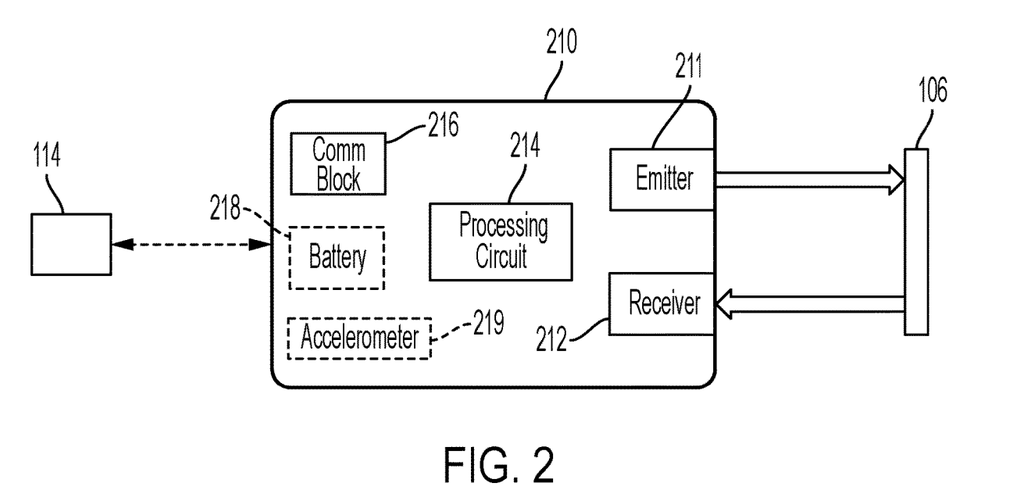
FIG. 2 illustrates a block diagram of a range sensor of the tandem position sensing system, according to some embodiments of the present disclosure.

FIG. 1 illustrates a vehicle utilizing the tandem position sensing system, according to some embodiments of the present disclosure. FIG. 2 illustrates a block diagram of a range sensor of the tandem position sensing system, according to some embodiments of the present disclosure.

As illustrated in FIG. 1, the heavy-duty vehicle 100 includes a tractor 102 coupled to a trailer/chassis 104, which has a sliding tandem 106 with a set of wheels that can slide along the length of the trailer/chassis 104. In some embodiments, the trailer 104 includes a tandem position sensing system 150, which includes a tandem position sensor 200 fixedly mounted to an underside (e.g., an undercarriage) of the trailer/chassis 104 and aimed at a target on the sliding tandem 106. In some examples, the tandem position sensor 200 may be mounted to a cross bar (e.g., an I-beam) 108 at the undercarriage of the trailer/chassis 104 at a position between the trailer/chassis kingpin 110 and the front of the sliding tandem 106. In some examples, the tandem position sensor 200 is mounted to the end of the track that the tandem 106 slides on and points toward a target on the tandem 106.

According to some embodiments, the tandem position sensor 200 includes a range sensor (e.g., a time-of-flight (ToF) sensor) that emits signal, such as a light signal (e.g., a laser beam) or a sound wave (e.g., an ultrasonic soundwave) toward an object and measures the time it takes for the reflected signal to return to the sensor 200 after reflecting off of the object. This allows the tandem position sensor 200 to measure the distance between it and the object. In some examples, the tandem position sensor 200 emits the signal toward a surface (e.g., a vertical surface) of the sliding tandem 106; however, embodiments of the present disclosure are not limited thereto. In some examples, the tandem position sensing system 150 further includes a reflector 300 that is mounted to, and moves with, the sliding tandem 106 and is capable of reflecting the emitted signal from the range sensor back to the tandem position sensor 200.

As the position of the tandem position sensor 200 relative to the trailer/chassis kingpin 110 is fixed and is a known value, it can calibrated into the tandem position sensor 200 to allow it to determine the distance between the kingpin 110 and the sliding tandem 106 (e.g., the center of the sliding tandem) at any given time. The distance between the kingpin 110 and the center of the sliding tandem 106 is referred to as the "wheelbase" and is an important parameter for a driver to be aware of, as it affects road weight distribution, ride control, handling, and turning radius of the vehicle 100. Additionally, the range of allowable wheelbase is regulated by some states, and violations of these regulations may result in heavy fines. In some embodiments, the tandem position sensing system 150 is capable of communicating the wheelbase, as well as other information to the driver and/or the dispatch/fleet manager, thus making it easier to comply with state regulations and to improve handling and ride control.

Referring to FIG. 2, in some embodiments, the tandem position sensor 200 includes a range sensor 210 that is houses within a sensor housing. The range sensor 210 includes an emitter (e.g., a light source, such as a light emitting diode (LED) or laser) 211 configured to emit the signal (e.g., light or laser) toward the sliding tandem 106, a receiver that is configured to receive the reflected signal from the sliding tandem 106, and a processing circuit that is configured to calculate the distance between the range sensor 210 and the sliding tandem 106 based on an emission time of the signal and a receive time of the reflected signal (i.e., the time of flight).

In some embodiments, the range sensor 210 is coupled to the electrical system of the trailer/chassis 104 and is electrically powered from the electrical circuit of the anti-lock braking system (ABS), the light circuit providing power to the lights of the trailer/chassis 104, a solar panel on the roof of the trailer 104, a power-over-ethernet (PoE) connection, wireless power transmission, and/or any other suitable source of power. For example, the range sensor 210 may include an internal battery (e.g., a rechargeable battery) 218 that can power operations of the range sensor 210.

The range sensor 210 may further include a communication block (e.g., a communication circuit) 216 for communicating the data generated by the processing circuit 214 to external sources. In some examples, the communication block 216 may communicate directly with a telematics gateway (e.g., a telematics gateway circuit) 114, which may be at the nose box of the trailer/chassis 104 and have wireless communication capability, so the data from the processing circuit 214 may be transmitted via cellular or broadband connection to an external server for monitoring. The communication block 216 may transmit data to the telematics gateway 114 over a controller area network (CAN) bus of the trailer/chassis 104, an RS232/485 connection, a power line communication (PLC) connection, Wi-Fi, Bluetooth, or any other connection via a suitable protocol.

As used herein, the term "processing circuit" includes any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

In some examples, the telematics gateway 114 may use a cellular connection or a Wi-Fi connection to communicate with a remote server 10 (e.g., a remote server 10 on the cloud 20), which may compile and further process the received data. A user device 30 associated with the driver, which may be a receiver and display in the cab of the truck 102 or a mobile device (e.g., tablet or phone) of the driver may receive information, such as the calculated wheelbase from the remote server 10 via a cellular or Wi-Fi connection. However, embodiments of the present disclosure are not limited thereto, and the range sensor 210 may communicate directly with the user device 30 via a wireless connection, such as Wi-Fi or Bluetooth.

According to some embodiments, the range sensor 210 is configured to periodically measure the distance to the sliding tandem 106 and to process and periodically transmit data based on the measured distance to the telematics gateway 114. The transmitted data may include at least one of the distance between the range sensor 210 and the sliding tandem 106, a distance between a kingpin 110 of the trailer or the chassis 104 and the center of the sliding tandem 106 (i.e., the wheelbase), a distance between a nose of the trailer or the chassis 104 and the sliding tandem (e.g., the center of the sliding tandem) 106, and an alert indicating an unlocked state of the sliding tandem 106 while in transit. The processing circuit 214 may determine the locked/unlocked status of the sliding tandem 106 based on detecting that the tandem position sensor 200 is in motion (e.g., via an accelerometer 219 in the tandem position sensor 200) and concurrently determining that the distance measurement is changing (e.g., increasing) over time. Such a determination may indicate that the sliding tandem 106 is not locked to the trailer/chassis 104 and is slipping away while the vehicle 100 is in motion. When relayed to a driver or a dispatcher, this information may be instrumental in ensuring the proper functionality and safety of the tandem 106.

In embodiments in which the range sensor lacks an accelerometer or a similar motion detection device, the telematics gateway 114 or the remote server 10 may be able to determine motion of the vehicle 100 based on speed and/or GPS position data of the vehicle 100 and provide an alert of the unlocked state of the sliding tandem 106 to the user device 30.

In addition to alerting the driver of potentially critical safety concerns, the data gathered by the tandem position sensor 200 may be incorporated into online or offline algorithms (that may be running on the remote server 10) to alert the driver when CSA violations are pending or changes in the turning radius of the vehicle are anticipated. In some examples, the remote server 10 may monitor the location of the vehicle 100 and inform the driver of the need to adjust the tandem position when the vehicle crosses a state border that necessitates the adjustment.

The tandem position sensor 200 is designed to be easily installed during trailer manufacture or a retrofit.

Figure 3A:
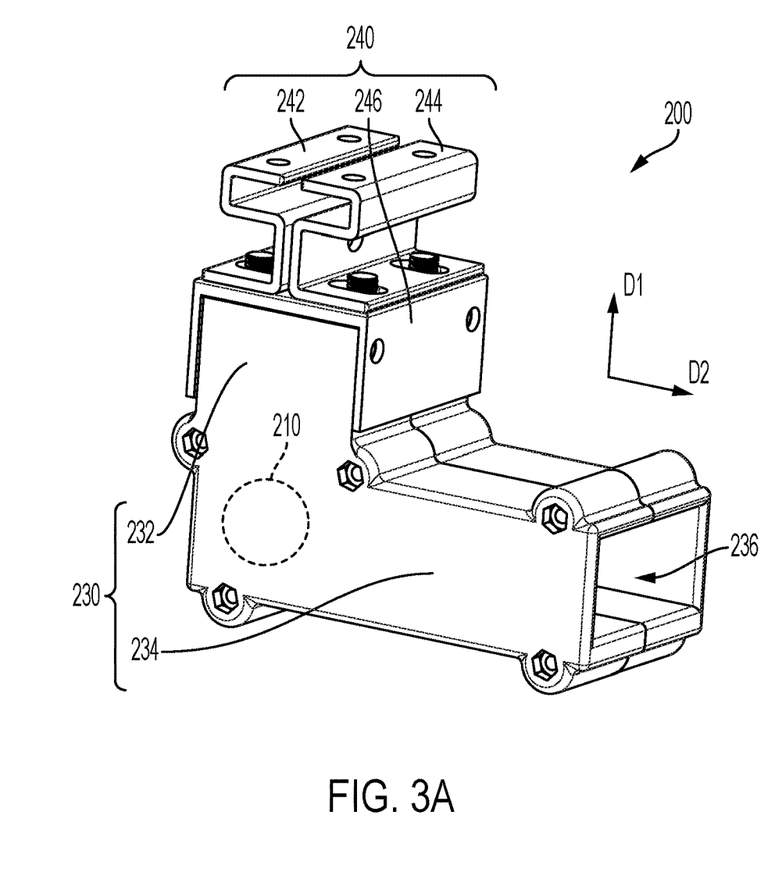
FIGS. 3A-3C illustrate various perspective views of the tandem position sensor, according to some embodiments of the present disclosure.
Figure 3B:
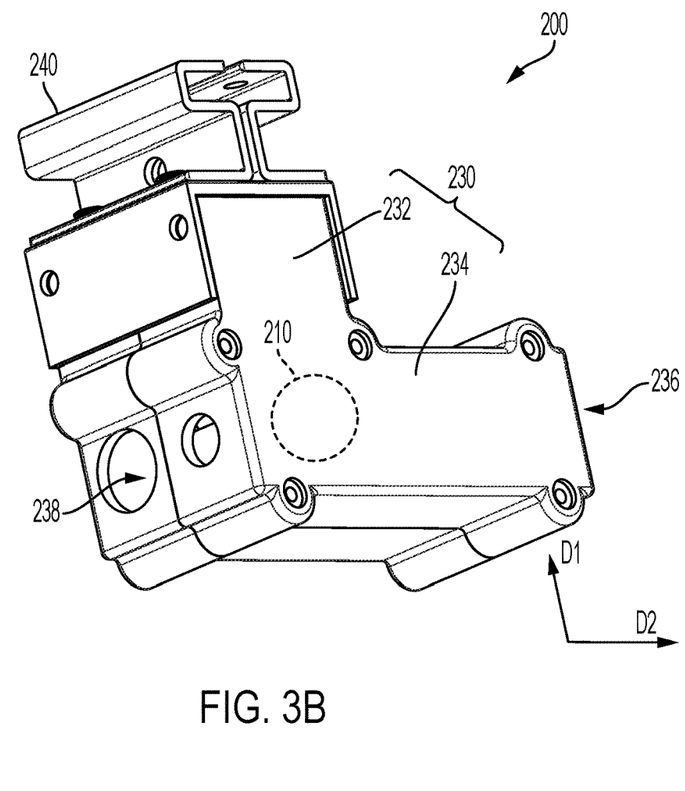
Figure 3C:
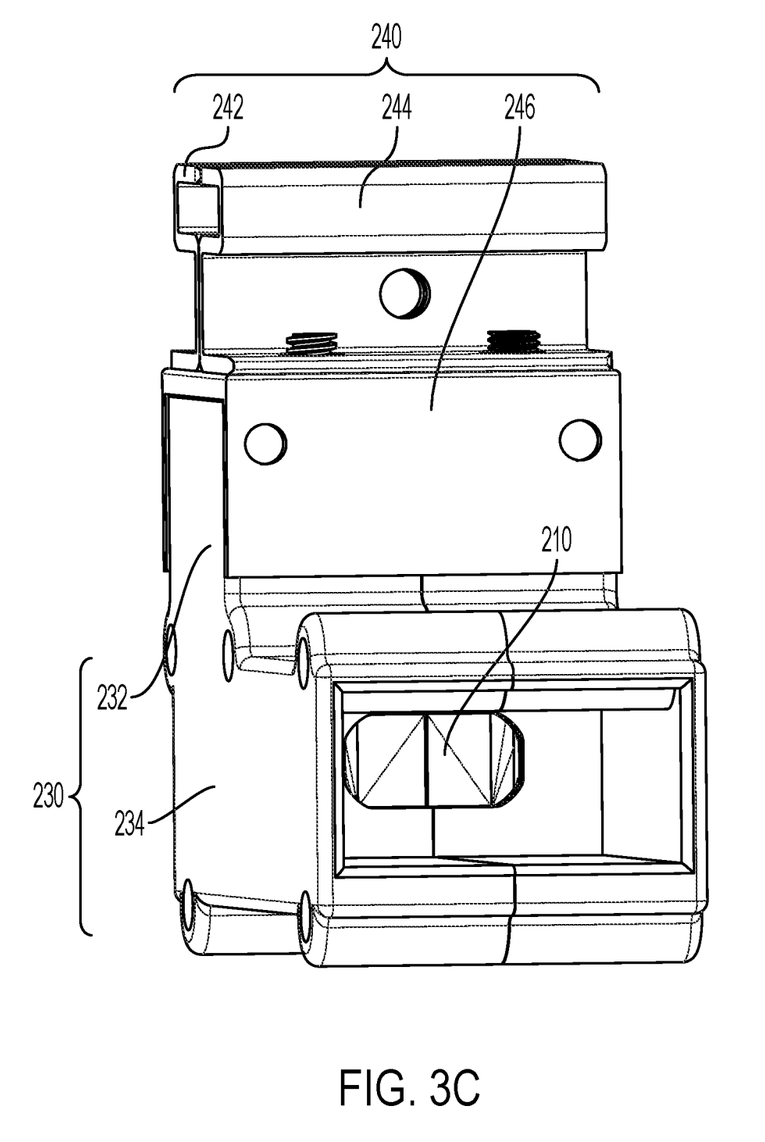
Figure 3D:
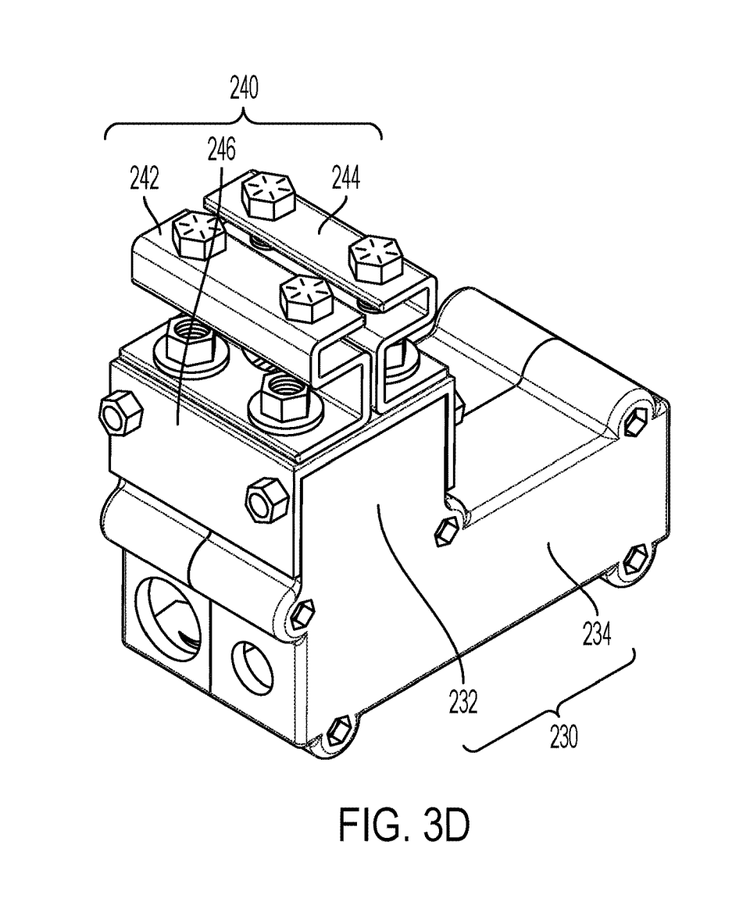
FIG. 3D illustrates a perspective view of the tandem position sensor in which its various constituent components are fastened together, according to some embodiments of the present disclosure.

FIGS. 3A-3C illustrate various perspective views of the tandem position sensor 200, according to some embodiments of the present disclosure. FIG. 3D illustrates a perspective view of the tandem position sensor 200 in which its various constituent components are fastened together, according to some embodiments of the present disclosure.

In some embodiments, the range sensor 210 is housed within the sensor housing 230, which protects the range sensor 210 from the elements. The sensor housing 230 is attached to a coupling member 240 that is configured to couple the sensor housing 230 to the body of the trailer/chassis 104.

The sensor housing 230 includes a main body 232 that is configured to house the range sensor 210 and is fixedly coupled to (e.g., bolted to) the coupling member 240. The sensor housing 230 further includes a barrel portion 234 that extends away from the main body 232 and has a first opening 236 through which the emitted signal and the reflected signal may travel to reach the sliding tandem 106 and the receiver 212, respectively. The main body 232 may generally extend in a first direction D1 and the barrel portion 234 may extend in a second direction D2 crossing the first direction D1. The first direction D1 may be a vertical direction when the tandem position sensor 200 is mounted to the trailer/chassis 104, and the second direction D2 may be orthogonal to the first direction and be aligned with or substantially aligned with the signal path of the range sensor 210.

While the tandem position sensor 200 is installed to be rear facing, when the vehicle is in motion, eddy currents can form circular airflow near the first opening 236, which can cause dirt and debris to move toward the first opening 236 and potentially enter the barrel portion 234. However, the length of the barrel portion 234 is set such that it can prevent or substantially prevent debris from reaching the range sensor 210 or any of the sensitive electronic circuits associated with the range sensor 210, which are positioned at the backside of the sensor housing 230 opposite from the first opening 236. Thus, the construction of the sensor housing 230 prevents contaminants, debris, dirt and other particulate material from covering the screen of the range sensor 210 so it can continue to operate in less-than-ideal environmental conditions.

While FIGS. 3A-3D illustrate the barrel portion 234 having a rectangular cross-section, embodiments of the present disclosure are not limited thereto. For example, the cross-sectional shape of the barrel portions 234 may be circular, elliptical, or any other suitable shape.

The sensor housing 230 may also have one or more second openings at the back of the housing 230 to allow for one or more electrical wires or cables that carry electrical signals to and from the range sensor 210 to pass through the sensor housing 230.

In some embodiments, the material making up the sensor housing 230 may include glass-filled nylon; however, embodiments of the present disclosure are not limited thereto, and the sensor housing 230 may include any suitable material.

Figure 4:
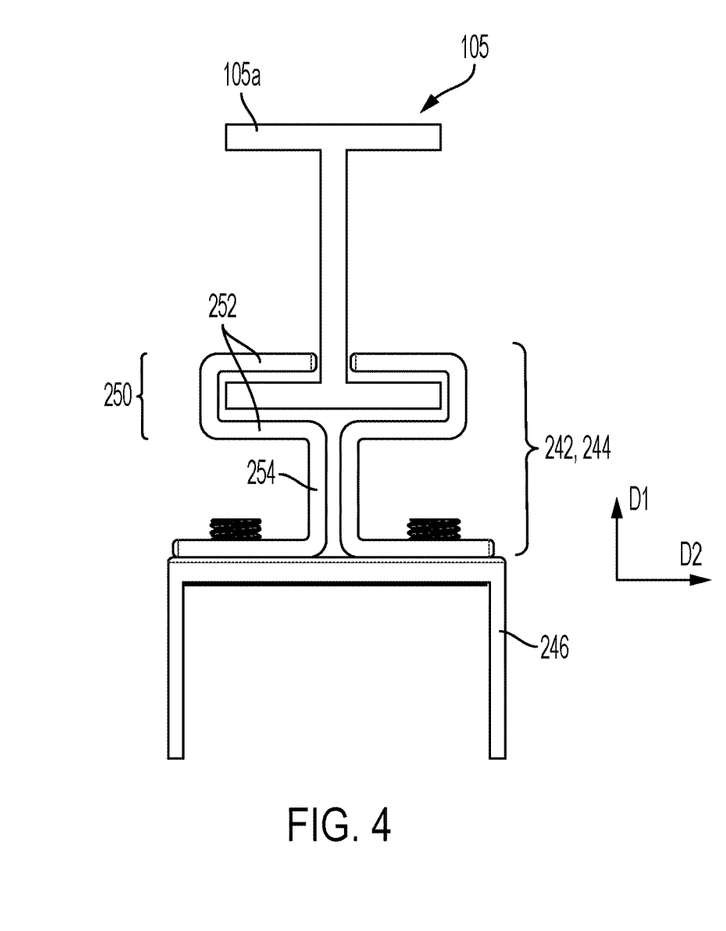
FIG. 4 illustrates a side view of a coupling member of the tandem position sensor, according to some embodiments of the present disclosure.

According to some embodiments, the coupling member 240 is configured to mount the sensor housing 230 onto an I-beam 105 of the undercarriage of the trailer/chassis 104. In some embodiments, the coupling member 240 includes a first fastener 242 and a second fastener 244 attached to a top side of the sensor housing 230 and facing one another, and a U-shaped mounting bracket 246 coupled to the first and second fasteners 242 and 244 and configured to be mounted to two sides (front and back sides) of the sensor housing 230. The mounting bracket 246 is configured to be bolted to the sensor housing 230 through a plurality of threaded through holes on the sides of the sensor housing FIG. 4 illustrates a side view of a coupling member 240 of the tandem position sensor 200, according to some embodiments of the present disclosure.

In some embodiments, the first and second fasteners 242 and 244 are shaped to grip a flange 105a of an I-beam 105 at a bottom side of the trailer/chassis 104. Each of the fasteners 242/244 includes a U-shaped clip 250 having two parallel arms 252 that extend along and overlap a flange 105a of an I-beam 105 of the trailer/chassis 104. In some examples, the parallel arms 252 extend along the second direction D2. One of the two parallel arms (e.g., the top arm when mounted) has a threaded through hole to enable a bolt to screw through and apply compressive force against the flange of the I-beam and to fasten the first U-shaped clip 250 to the I-beam 105 (see, e.g., FIG. 3D). Each of the fasteners 242/244 also includes a stem 254 that extends from one of the two parallel arms (e.g., the bottom arm when mounted) and is configured to be fastened to the sensor housing 230 (e.g., via a screw or a nut and bolt; see, FIG. 3D). The separation between the two stems 254 (e.g., as defined along the second direction D2) may be adjustable to accommodate I-beams with different flange widths (e.g., as measured along the second direction D2). This allows the tandem position sensor to be used with a wide variety of trailers/chassis.

As noted above, in some examples, the sliding tandem 106 may provide ample surfaces for reflecting the signal emitted by the emitter 211 of the range sensor 210 back at the receiver 212. However, if the sliding tandem lacks an adequate reflective surface, a reflector 300 may be utilized, as noted above.

In some embodiments, the tandem position sensing system 150 further includes a reflector 300 that is configured to be mounted to the sliding tandem 106 and to reflect a signal back at the range sensor 210.

Figure 5A:
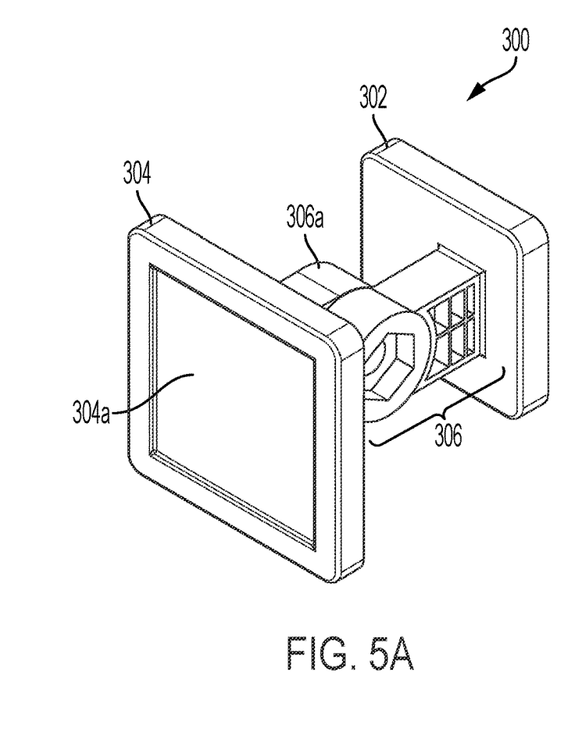
FIGS. 5A-5B illustrate perspective views of a reflector of the tandem position sensing system, according to some embodiments of the present disclosure.
Figure 5B:
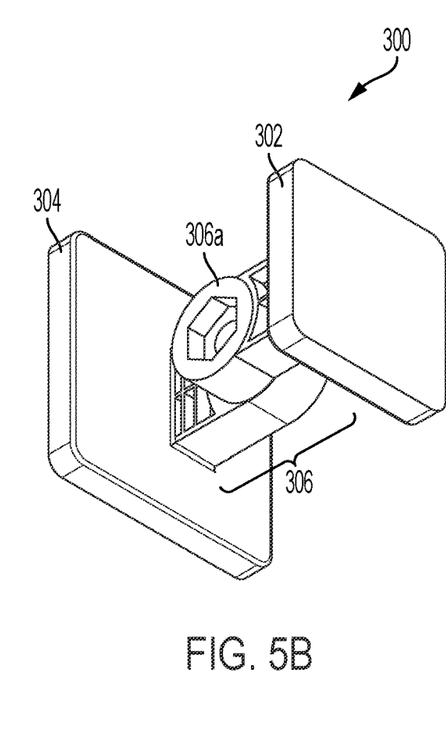
Figure 5C:
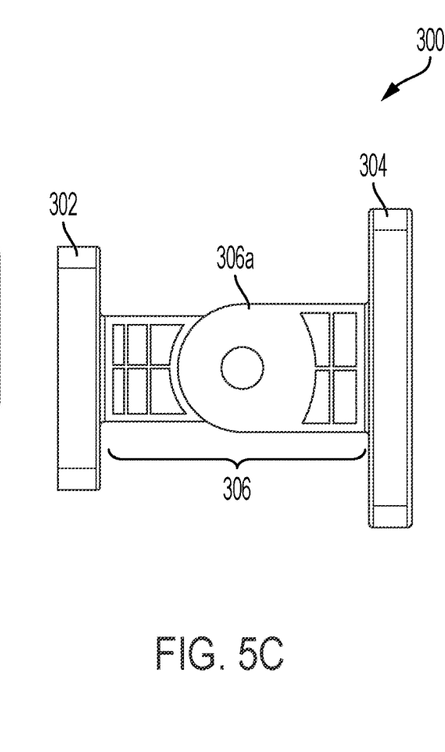
FIG. 5C illustrates a side view of the reflector, according to some embodiments of the present disclosure.

FIGS. 5A-5B illustrate perspective views of the reflector 300, according to some embodiments of the present disclosure. FIG. 5C illustrates a side view of the reflector 300, according to some embodiments of the present disclosure.

According to some embodiments, the reflector 300 includes a mounting bracket 302 that is configured to attach to a surface of the sliding tandem 106, for example, via a double-sided adhesive, a screw, or any other suitable fastening mechanism. The reflector 300 also includes a reflective portion 304 having a flat reflective surface 304a that is configured to reflect the signal back at the range sensor 210, and a bendable arm 306 that couples the mounting bracket 302 and reflective portion 304 together. The bendable arm 306 is configured to bend at a joint 306a to adjust a relative angle of the mounting bracket and the reflective portion. The angle adjustability provides great flexibility in terms of the surfaces that the reflector can be mounted to on the sliding tandem 106. the material making up the reflector 300 may include glass-filled nylon; however, embodiments of the present disclosure are not limited thereto, and the reflector 300 may include any suitable material.

As described above, the tandem position sensing system measures and reports the wheelbase of a trailer/chassis as wells as other relevant information related to the position and state of the sliding tandem. For example, the tandem position sensor 200 can alert the driver (or in the case of an autonomous vehicle, a vehicle controller) to the expected turning radius of the coupled trailer. This information may be particularly desirable prior to entering inner cities or other places where tighter turning radiuses are expected or necessary. Further, the tandem position sensor 200 may alert a driver and/or dispatcher to tandem positions that violate local laws or ordinances before enforcement officers notice or have a chance to react to the infraction, thus avoiding fines, CSA violations, and/or the like. Furthermore, the sensor data can also be used to confirm whether or not the sliding tandem 106 has inadvertently moved during operation, indicating an unlocked tandem 106, which can be a potentially critical safety concern.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The range sensor 210 and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the range sensor 210 may be formed on one integrated circuit (IC) chip or on separate IC chips. Further, the various components of the range sensor 210 may be implemented on a flexible printed circuit film, a tape carrier package (TCP), a printed circuit board (PCB), or formed on a same substrate. Further, the various components of the range sensor 210 may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The present disclosure is not to be limited in scope by the specific embodiments described herein. Indeed, other various embodiments of and modifications to the present disclosure, in addition to those described herein, may be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art may recognize that its usefulness is not limited thereto and that the present disclosure may be beneficially implemented in any number of environments for any number of purposes. Accordingly, the claims set forth below should be construed in view of the full breadth and spirit of the present disclosure as described herein and equivalents thereof.

Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and equivalents thereof.

What is claimed is:

1. A tandem position sensing system comprising:
   a range sensor configured to emit a signal toward a sliding tandem and to measure a distance between the range sensor and the sliding tandem;
   a sensor housing configured to house the range sensor, the sensor housing having a first opening through which the range sensor is configured to emit the signal; and
   a coupling member attached to the sensor housing and configured to fixedly couple the range sensor housing to a body of a trailer or a towed chassis.

2. The tandem position sensing system of claim 1, wherein the range sensor comprises a time-of-flight (ToF) sensor, and the signal comprises a light signal or a sound wave.

3. The tandem position sensing system of claim 1, wherein the range sensor comprises:
   an emitter configured to emit the signal toward the sliding tandem;
   a receiver configured to receive a reflected signal from the sliding tandem; and
   a processing circuit configured to calculate the distance between the range sensor and the sliding tandem based on an emission time of the signal and a receive time of the reflected signal.

4. The tandem position sensing system of claim 3, wherein the range sensor further comprises:
   a communication circuit in electrical communication with a telematics gateway circuit at the trailer or the towed chassis and is configured to transmit data generated by the processing circuit to the telematics gateway circuit over a controller area network (CAN) bus of the trailer or the towed chassis, an RS232/485 connection, a power line communication (PLC) connection, or a wireless communication link.

5. The tandem position sensing system of claim 1, wherein the range sensor comprises:

an internal battery configured to provide electrical power to the range sensor.

6. The tandem position sensing system of claim 1, wherein the range sensor is coupled to an electrical system of the trailer or the towed chassis and receives electrical power from at least one of an electrical circuit of an anti-lock braking system (ABS) of the trailer or the towed chassis, a light circuit providing power to lights of the trailer or the towed chassis, and a power-over-ethernet (POE) connection.

7. The tandem position sensing system of claim 1, wherein the range sensor is configured to periodically transmit data based on the distance between the range sensor and the sliding tandem, and
   wherein the data comprises at least one of:
      the distance between the range sensor and the sliding tandem,
      a distance between a kingpin of the trailer or the towed chassis and the sliding tandem,
      a distance between a nose of the trailer or the towed chassis and the sliding tandem, and
      an alert indicating an unlocked state of the sliding tandem while in transit.

8. The tandem position sensing system of claim 1, wherein the sliding tandem comprises a sliding trailer tandem or a sliding chassis tandem, and
   Wherein the sliding tandem has an adjustable position along a length of the trailer or the towed chassis.

9. The tandem position sensing system of claim 1, wherein the sensor housing comprises:
   a main body configured to house the range sensor and fixedly coupled to the coupling member; and
   a barrel extending away from the main body generally along a signal path of the range sensor.

10. The tandem position sensing system of claim 1, wherein the sensor housing comprises glass-filled nylon material.

11. A tandem position sensing system comprising:
   a range sensor configured to emit a signal toward a sliding tandem and to measure a distance between the range sensor and the sliding tandem;
   a sensor housing configured to house the range sensor, the sensor housing having a first opening through which the range sensor is configured to emit the signal; and
   a coupling member attached to the sensor housing and configured to couple the range sensor housing to a body of a trailer or a towed chassis,
      wherein the coupling member comprises a first fastener and a second fastener attached to a top of the sensor housing and facing one another, the first and second fasteners being configured to grip a flange of an I-beam at a bottom side of the trailer or the towed chassis.

12. The tandem position sensing system of claim 11, wherein the first fastener comprises:
   a first U-shaped clip having two parallel arms that extend along and overlap a flange of an I-beam, one of the two parallel arms having a threaded through hole to enable a bolt to screw through and apply compressive force against the flange of the I-beam and to fasten the first U-shaped clip to the I-beam; and
   a first stem extending from an other one of the two parallel arms and configured to be fastened to the sensor housing.

13. The tandem position sensing system of claim 11, wherein the coupling member further comprises:
   a U-shaped mounting bracket coupled to the first and second fasteners and configured to be mounted to two sides of the sensor housing, and
   wherein the U-shaped mounting bracket is configured to be bolted to the sensor housing through a plurality of threaded through holes on the sides of the sensor housing.

14. A tandem position sensing system comprising:
   a range sensor configured to emit a signal toward a sliding tandem and to measure a distance between the range sensor and the sliding tandem;
   a sensor housing configured to house the range sensor, the sensor housing having a first opening through which the range sensor is configured to emit the signal;
   a coupling member attached to the sensor housing and configured to couple the range sensor housing to a body of a trailer or a towed chassis; and
   a reflector configured to be mounted to the sliding tandem and to reflect the signal back to the range sensor.

15. The tandem position sensing system of claim 14, wherein the reflector comprises:
   a mounting bracket configured to attach to a surface of the sliding tandem;
   a reflective portion having a reflective surface configured to reflect the signal back to the range sensor; and
   a bendable arm coupled to the mounting bracket and the reflective portion and configured to bend at a joint to adjust a relative angle of the mounting bracket and the reflective portion.

16. The tandem position sensing system of claim 14, wherein the reflector comprises glass-filled nylon material.

\* \* \* \* \*